United States Patent [19]
Mize

[11] Patent Number: 5,989,313
[45] Date of Patent: Nov. 23, 1999

[54] METHOD FOR OPERATION OF AN AIR PREPURIFIER WHICH TAKES INTO ACCOUNT INLET AIR CONDITIONS

[75] Inventor: James Brian Mize, Williamsville, N.Y.

[73] Assignee: Praxair Technology, Inc., Danbury, Conn.

[21] Appl. No.: 08/994,480

[22] Filed: Dec. 19, 1997

[51] Int. Cl.$^6$ ................................. B01D 53/047
[52] U.S. Cl. ................. 95/10; 95/11; 95/12; 95/15; 95/21; 95/22; 95/23; 95/96; 95/121; 95/139; 95/143; 96/111; 96/112; 96/113; 96/130
[58] Field of Search ................. 95/10, 12, 14, 95/15, 19, 21–23, 117–119, 121, 139, 143; 96/111–115, 130, 143

[56] References Cited

U.S. PATENT DOCUMENTS

| | | | |
|---|---|---|---|
| 3,944,400 | 3/1976 | Bird | 96/111 X |
| 4,197,095 | 4/1980 | White, Jr. et al. | 95/23 X |
| 4,205,967 | 6/1980 | Sandman et al. | 96/115 X |
| 4,247,311 | 1/1981 | Seibert et al. | 96/111 |
| 4,315,759 | 2/1982 | Benkmann | 95/23 |
| 4,323,370 | 4/1982 | Leitgeb | 95/23 |
| 4,404,005 | 9/1983 | Hamlin et al. | 96/111 |
| 4,472,177 | 9/1984 | Sircar | 96/111 X |
| 4,479,815 | 10/1984 | Tinker et al. | 96/130 X |
| 4,539,019 | 9/1985 | Koch | 96/113 X |
| 4,605,425 | 8/1986 | Verrando et al. | 96/111 X |
| 4,627,860 | 12/1986 | Rowland | 96/111 |
| 4,643,743 | 2/1987 | Grader | 55/26 |
| 4,693,730 | 9/1987 | Miller et al. | 55/18 |
| 4,725,293 | 2/1988 | Gunderson | 55/162 |
| 4,810,265 | 3/1989 | Lagree et al. | 55/26 |
| 4,822,384 | 4/1989 | Kato et al. | 96/111 X |
| 4,857,086 | 8/1989 | Kawai | 96/111 |
| 4,927,434 | 5/1990 | Cordes et al. | 96/112 X |
| 5,042,994 | 8/1991 | Smolarek | 55/18 |
| 5,199,964 | 4/1993 | Gräff | 95/14 |
| 5,258,056 | 11/1993 | Shirley et al. | 95/22 |
| 5,407,465 | 4/1995 | Schaub et al. | 95/14 |
| 5,593,478 | 1/1997 | Hill et al. | 96/111 |

FOREIGN PATENT DOCUMENTS

0251235 12/1987 European Pat. Off. .

*Primary Examiner*—Robert Spitzer
*Attorney, Agent, or Firm*—Robert J. Follett

[57] ABSTRACT

A pressure swing adsorber (PSA) air prepurifier includes at least a first adsorber and a second adsorber and a controller for controlling air feed to the first adsorber and the second adsorber. The invention is a "realtime" method for controlling cycle times for each adsorber and includes the following steps. During a determined time period, flow is measured to an adsorber that is coupled to an air inlet. An actual totalized flow to the on-line adsorber is accumulated, based upon the measured flow values. During this time, air feed conditions (e.g., temperature, pressure, relative humidity) are monitored and periodically, a maximum totalized flow to the adsorber is calculated, determined, at least in part, based upon the monitored air feed conditions. Periodically, the actual totalized flow value is compared to a current calculated maximum totalized flow value and upon a predetermined relationship therebetween being reached, the on-line adsorber is decoupled from the air inlet and another adsorber is coupled thereto. The method for controlling cycle times for each adsorber also will take into consideration: variations in load demand, purge to feed ratio and upsets which occur on switching of adsorber beds.

18 Claims, 6 Drawing Sheets

FIXED-TIME CONTROLLED CYCLE
END OF CYCLE

FIG. 2A
PRIOR ART (Controlled by pressure, temperature, humidity and flow)

FIG. 2B

FIXED-TIME CONTROLLED CYCLE
(SAME INLET CONDITIONS)

FIG. 3A
PRIOR ART

-CONTROLLED CYCLE
(SAME INLET CONDITIONS)

METHOD FOR OPERATION OF AN AIR PREPURIFIER WHICH TAKES INTO ACCOUNT INLET AIR CONDITIONS

FIELD OF THE INVENTION

This invention relates to air prepurifiers that are used with cryogenic air separation plants and, more particularly, to an improved method for control of an air prepurifier which takes into account various air inlet conditions and adjusts the operation of the air prepurifier accordingly.

BACKGROUND OF THE INVENTION

Cryogenic air separation plants require a source of clean, dry air for sustained and safe operation. This means that the moisture and carbon dioxide in the plant feed air must be removed to a very low level. Such removal reduces the problem of heat exchangers becoming plugged with ice and solid carbon dioxide, an occurrence which can prematurely cause plant shutdown. Further, any hydrocarbons contained in the feed air need also to be removed.

Feed air can be cleaned of contaminants by adsorption. Thermal swing adsorption (TSA) and, more recently, pressure swing adsorption (PSA) systems have been used for contaminant removal. TSA air prepurifier systems used in air separation plants have relatively long cycle times (measured in hours) and blowdown losses between cycles are thus relatively insignificant. By contrast, PSA cycle times are relatively short (measured in minutes) and their more frequent blowdowns represent a relatively significant loss of pressurized feed air. In addition, during cycle changes there is an accompanying upset in the process. This upset requires a finite amount of time to counteract, causing further losses in efficiency.

The design of a PSA prepurifier system is generally based upon given conditions for a particular application or, more specifically, a given air separation plant under design. The design conditions are conservatively chosen so that a desired rate of product can be produced under most of the expected ambient conditions. A fixed time cycle is generally chosen to fit these conditions as closely as possible. Naturally, the actual conditions of operation will vary, day to night, day to day, and season to season.

All of these variations affect the performance and efficiency of operation of the PSA prepurifier. The cycle time can be adjusted somewhat from time to time.

However, in actual practice this is frequently not done or just overlooked. Thus the design of the system will often provide for larger beds than would actually be required for a normal or average day. A certain amount of the bed will thus remain unused for many cycles. This results in higher capital cost and also in higher operating costs because of a higher frequency of cycling, with greater blowdown losses.

The use of PSA air prepurifiers for cryogenic air separation plants is well established. As indicated above, prepurifier cycle times are generally fixed and are based on assumptions regarding ambient and equipment parameters. Thus, calculations of adsorptive capacity based on total air flow and keyed on the breakthrough of carbon dioxide are used to determine cycle time for a particular application. Further, to be conservative, the calculations are based on an assumption of the hottest day temperature. Such calculations result in a fixed cycle time during which only a portion of the adsorptive capacity of the bed is used. Once the fixed cycle time was established, it thereafter remained constant.

An example of a timed-cycle PSA system may be found in U.S. Pat. No. 5,042,994, Smolarek, J., "Improved Control of PSA Operations". The Smolarek process uses a variable volume nitrogen product storage vessel that is monitored to determine variations in demand. The cycle is adjusted during periods of reduced demand to maintain the desired product purity and pressure with power reduction and energy savings being achieved under turndown conditions.

Another example of a time-controlled PSA system is found in U.S. Pat. No. 4,810,265, Lagree et al., "Pressure Swing Adsorption Process for Gas Separation". This is an improved PSA process which enables the more readily adsorbable component of a feed gas to be economically recovered, e.g. nitrogen from air. The more readily adsorbable component is used as a copurge at an upper adsorption pressure and less readily adsorbable component is used for countercurrent purge at a subatmospheric desorption pressure and for initial repressurization in a countercurrent backfilling step. The sequence of operations is time-controlled.

U.S. Pat. No. 5,258,056, Shirley, A. I., "PSA System with Product Turndown and Purity Control" describes a control system which maintains a desired purity while adjusting for changes in product demand in a PSA system. A sensing device detects a change in product gas demand, the signal from which is compared to a standard which then varies the feed rate of the gas entering the system.

U.S. Pat. No. 4,725,293, Gunderson, J., "Automatic Control for Pressure Swing Adsorption System" describes a PSA system which uses a constant cycle time and a control system to modify air input flow to insure that the produced nitrogen contains only a preselected range of impurity (consisting essentially of oxygen) and to keep the output flow of nitrogen relatively high.

U.S. Pat. No. 4,693,730, Miller,G. Q., "Pressure Swing Adsorption Product Purity Control Method and Apparatus" describes a method for automatically controlling product purity in a PSA process, thus preventing impurity breakthrough as feedstock changes. The process senses a characteristic of the effluent from concurrent depressurization and takes corrective action. Among suitable corrective actions are: 1) adjusting adsorption step time to control impurity loading of each bed; 2) adjusting the concurrent depressurization termination pressure to control impurity breakthrough at the product end of each bed and/or 3) adjusting the amount of purging gas received by each bed to control the extent of regeneration.

EPA 250235, Armond, J. W. et al., "Improvements in and Relating to PSA Oxygen Generating System" describes a system which senses oxygen concentration at the outlet of adsorption beds, while producing oxygen. An oxygen sensor output, located close to the outlet of each bed, varies with time as a function of the exhaustion of a bed. The control system monitors the oxygen concentration with time to determine the time to switch beds.

Accordingly, it is an object of the invention to provide an improved method for control of the cycle time of a PSA air prepurifier.

It is a further object of the invention to provide a method for control of the cycle time of a PSA air prepurifier wherein substantially continuous control is exerted in dependence upon inlet air feed parameters.

It is a still further object of the invention to provide a method for control of the cycle time of a PSA air prepurifier which enables a maximal use of adsorbent beds during cycle times.

SUMMARY OF THE INVENTION

A pressure swing adsorber (PSA) air prepurifier includes at least a first adsorber and a second adsorber and a controller for controlling air feed to the first adsorber and the second adsorber. The invention is a "real time" method for controlling cycle times for each adsorber and includes the following steps. During a determined time period, flow is measured to an adsorber that is coupled to an air inlet. An actual totalized flow to the on-line adsorber is accumulated, based upon the measured flow values. During this time, air feed conditions (e.g., temperature, pressure, relative humidity) are monitored and periodically, a maximum totalized flow to the adsorber is calculated, determined, at least in part, based upon the monitored air feed conditions. Periodically, the actual totalized flow value is compared to a current calculated maximum totalized flow value and upon a predetermined relationship therebetween being reached, the on-line adsorber is decoupled from the air inlet and another adsorber is coupled thereto. The method for controlling cycle times for each adsorber also will take into consideration: variations in load demand, purge to feed ratio and upsets which occur on switching of adsorber beds.

DETAILED DESCRIPTION OF PREFERRED EMBODIMENTS OF THE INVENTION

Figure 1A:
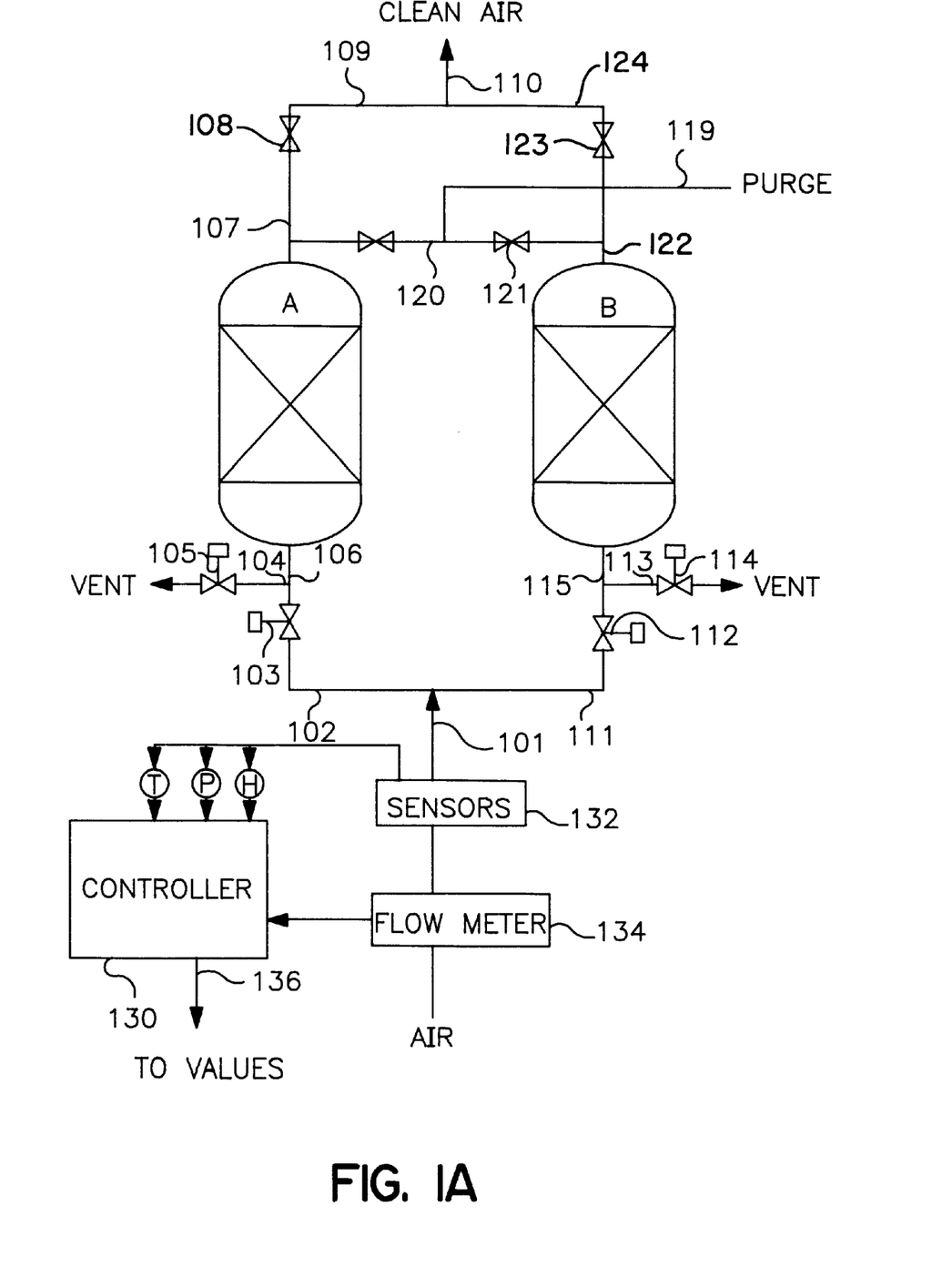
FIG. 1A is a schematic diagram of a PSA prepurifier which incorporates the invention.

A PSA prepurifier system incorporating the invention is shown in FIG. 1A. Air from an air compressor aftercooler (not shown) is admitted to the system through piping 101 and directed to a controlled valve 103 by way of piping 102. The air is fed into adsorber A through piping 106. Water, carbon dioxide and hydrocarbons in the feed air are removed by the adsorbents in adsorber A, each preferably to less than 1 ppmv. The clean air then passes through piping 107, check valve 108, piping 109 and piping 110 for delivery to the heat exchange system of a cryogenic plant.

At the same time, low pressure purge gas at about ambient temperature from the heat exchange system is brought into the PSA system through piping 119, 120 and check valve 121. It is then delivered to adsorber B where the contaminants are desorbed. The waste gas leaves adsorber B by way of piping 115, 113, and controlled valve 114 for venting to the atmosphere. Upon cycle change, adsorber B removes the contaminants from the feed air while adsorber A is being regenerated. "During the removal of contaminants using adsorber B, piping 111 and control valve 112 function in the same manner and for the same purpose as piping 102 and control valve 103 do during the removal of contaminants using adsorber A. Clean air passes through piping 122, check valve 123, piping 124 and piping 110 for delivery to the heat exchange system of a cryogenic plant. Waste gas from adsorber A leaves by way of piping 104 and controlled valve 105 for venting to the atmosphere in the same fashion as waste gas leaves adsorber B described above."

The invention provides a means of minimizing the depressurization losses in PSA prepurifiers by varying the cycle times so that the full adsorptive capacity of each prepurifier bed is used. The adsorptive capacity of a bed is determined by the quantity and characteristics of the adsorbent material, the contaminants to be removed from the air, the flow and physical parameters of air through the bed and the purge-to-air flow ratio. For any given PSA system containing a known amount of adsorbent material, or combination of adsorbent materials, the adsorbent capacity can be determined for a given flow through the bed, knowing the temperature, pressure and humidity at the inlet to the bed. The total flow may then be determined at which point a key component (e.g., carbon dioxide) will begin to appear in the outlet effluent in concentrations well below the allowable operating limit, typically less than 1 $ppm_v$ (i.e., "breakthrough").

In accordance with the invention, the maximum totalized flow into an adsorber bed (which will determine the cycle time for a given sized PSA Prepurifier unit) is adjusted in accordance with the air feed temperature, pressure and relative humidity. In addition, it is also affected by the purge-to-feed ratio and the concentration of hydrocarbons and carbon dioxide in the air feed stream. An empirically determined procedure that determines the totalized flow based on these variables is used to determine the maximum totalized flow that can be passed through a bed before it must be regenerated.

To enable control in accord with the above, a controller 130 receives temperature (T), pressure (P) and relative humidity (H) inputs from a sensors module 132 that is positioned in inlet piping 101. A flowmeter 134 provides a gas flow value input to controller 130. Further, Controller 130 is provided with a plurality of outputs 136 which connect to the various controlled valves (not shown) to enable cycle control of the system.

Figure 1B:
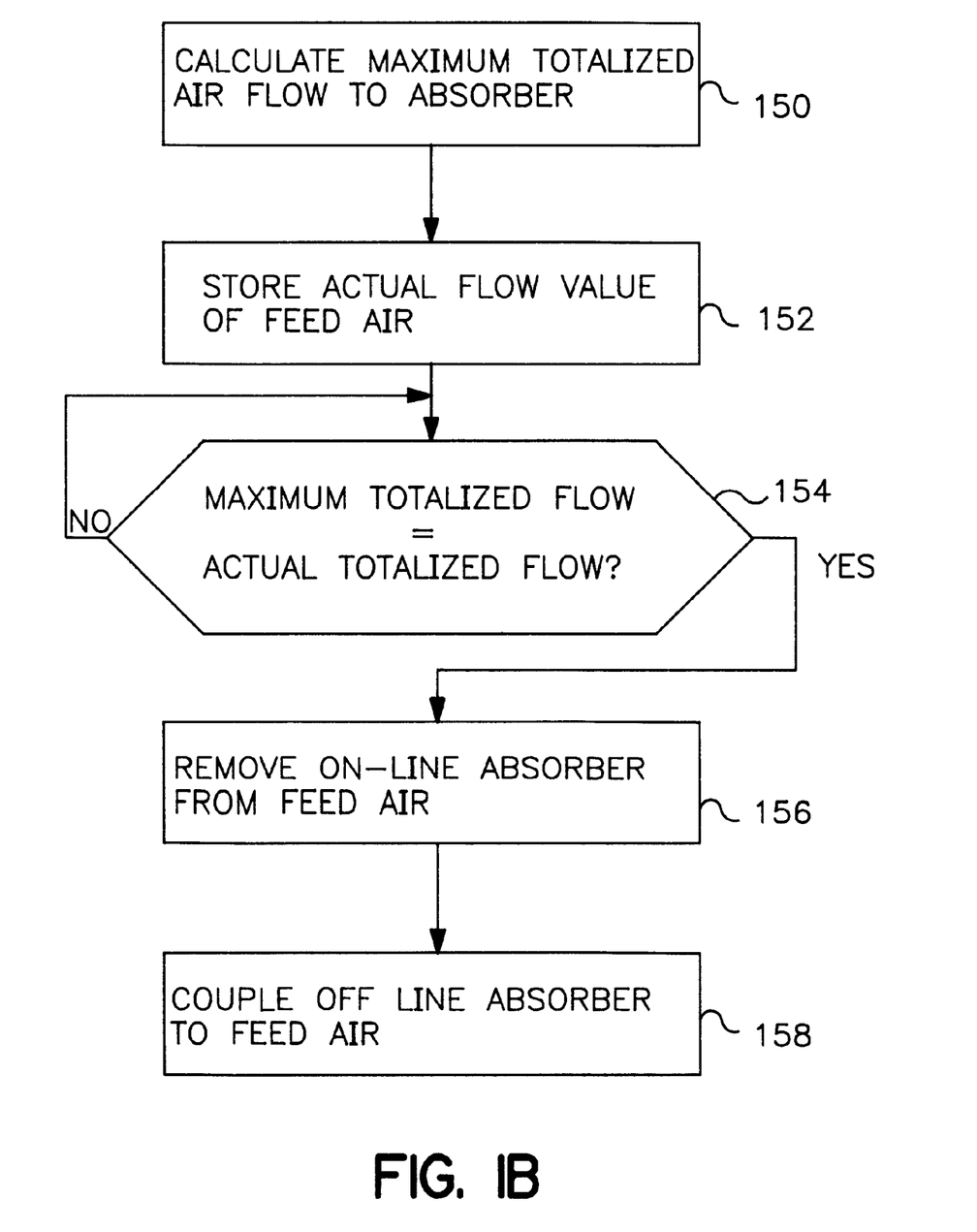
FIG. 1B is a high level logic flow diagram illustrating the method of the invention.

As shown in the flow diagram of FIG. 1B, during operation, controller 130 calculates a maximum totalized flow each minute (for example), based on the prevailing operating conditions (box 150). The actual flow value accumulated during this minute by controller 130 is stored (box (152). When the running total of the actual flow is approximately equal to the running total of the maximum totalized flow, or is found to have a predetermined relationship with respect thereto (decision box 154), the on-line adsorber bed is taken off-line by signals impressed on outputs 136 from controller 130 (box 156). At such time, valving is operated to divert the inlet air flow to the previously off-line adsorber bed which becomes the on-line adsorber bed (box 158). The now off-line bed is then regenerated and the cycle repeats.

The method of the invention accommodates changes in air feed temperature, air pressure and relative humidity, even though relatively small, during a 5 to 25 minute cycle, while still allowing for daily and seasonal variations in temperature which can be quite significant. Thus, the method takes into account daily as well as seasonal changes in operating conditions and plant demand and accrues economic advantages under all conditions. Air feed conditions are monitored to ascertain the moisture content of air being fed into the adsorber. By utilizing the maximum adsorptive capacity of the adsorber bed, the frequency of cycle changes is correspondingly minimized. This thereby reduces the amount of process air lost on blowdown and improves operating efficiency.

The purge-to-air flow is controlled, based on the air flow and the column recovery, to match the particular demand of the plant. This insures that the bed is properly and efficiently regenerated for a next cycle.

Every time the cycle switches, there is a variation in the pressure delivered to the air separation unit. This variation affects the performance of the unit and in particular the distillation system. A finite amount of time is required for the distillation columns to recover from the disturbance and the resulting upset must be compensated by an adjustment of the product flow and purity. By anticipating the cycle change and ensuing disturbances, controller 130 is able to maximize the air available to the plant to minimize the effect of the cycle change. This action helps to stabilize the air flow during cycle changes.

The invention lends itself well to changes in demand for product. If the load on the air separation plant is reduced, controller 130 is signaled to recognize the reduced demand and, in response, extends the cycle time of the on-line adsorber bed until that bed is loaded up to the maximum, as determined by the totalized air flow. Again this reduces the blowdown losses to a minimum and thus reduces costs.

Figure 2A:
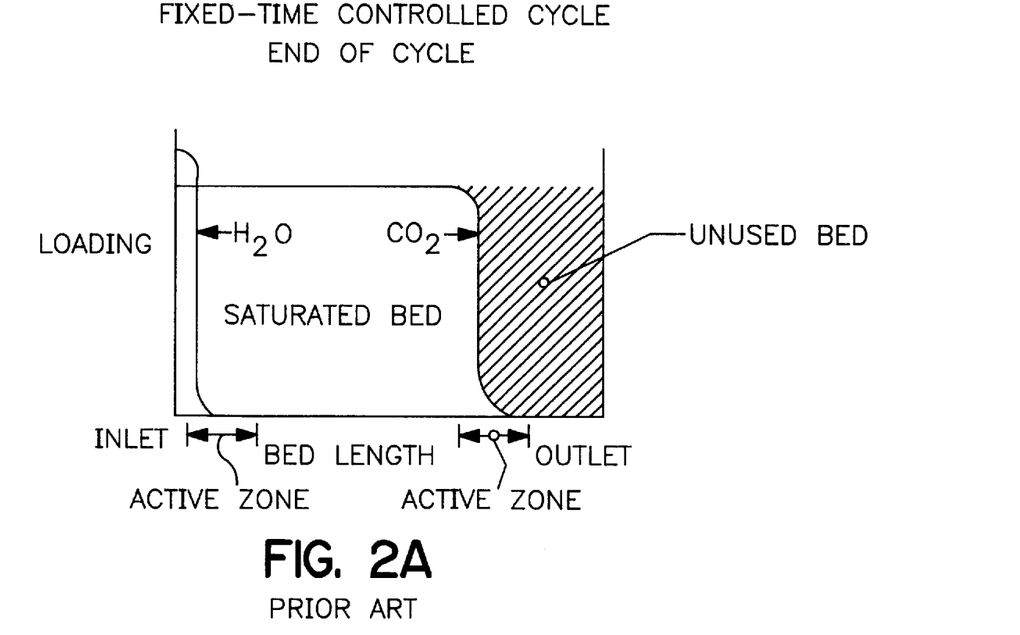
FIG. 2A is a plot of loading vs. bed length at the end of a fixed time controlled cycle.

The operating improvement obtained by the invention is demonstrated graphically by the following FIG. 2A shows the condition of an adsorber bed at the end of a fixed-time controlled cycle, as in the prior art. The ordinate gives the loading of water and carbon dioxide on the adsorbent, plotted against the length of the bed. The left hand portion of the loading curves shows the saturated condition of the bed with respect to both water and carbon dioxide from the inlet of the bed to the active zones. The loading curves drop off steeply and then asymptotically approach zero.

The useful life of the bed is determined by the loading of carbon dioxide. The area to the right of the active zone of the carbon dioxide curve represents the adsorbent that remains unused at the end of the cycle. As can be seen, the unused portion represents a significant portion of the total bed.

Figure 2B:
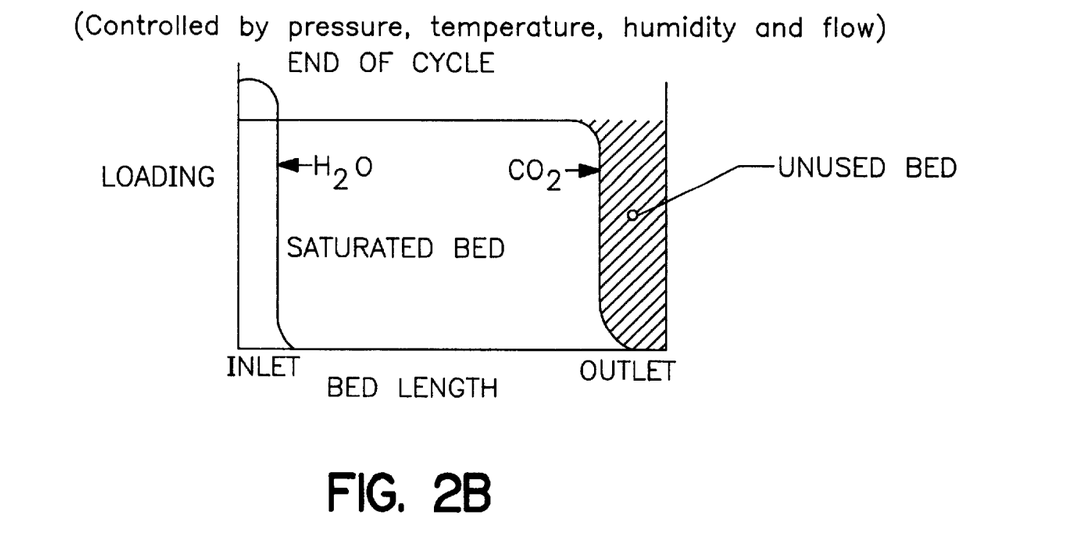
FIG. 2B is a plot of loading vs. bed length at the end of a cycle that is controlled in accord with the invention.

FIG. 2B presents the operation of the PSA system having a cycle controlled in accord with the invention. The inlet conditions to the bed are identical to those given for FIG. 2A. The cycle time is controlled by the flow, pressure, temperature and humidity of the air to the inlet of the bed. In this case the unused portion of the bed has been significantly reduced. The method of the invention permits the adsorber bed to be loaded to the maximum so that the toe of the loading curve is still below the limit established for the concentration of the carbon dioxide in the effluent.

By totalizing the air flow to the prepurifier, the method permits optimum operation for all inlet conditions of the adsorber bed, including variations in air flow. Thus the changes in the load on the plant can easily be followed while still maintaining the same high efficiency. By this mode of operation, the frequency of cycle changes is minimized and thus the blowdown losses are likewise reduced to a minimum. A corresponding reduction in power cost is also obtained.

Figure 3A:
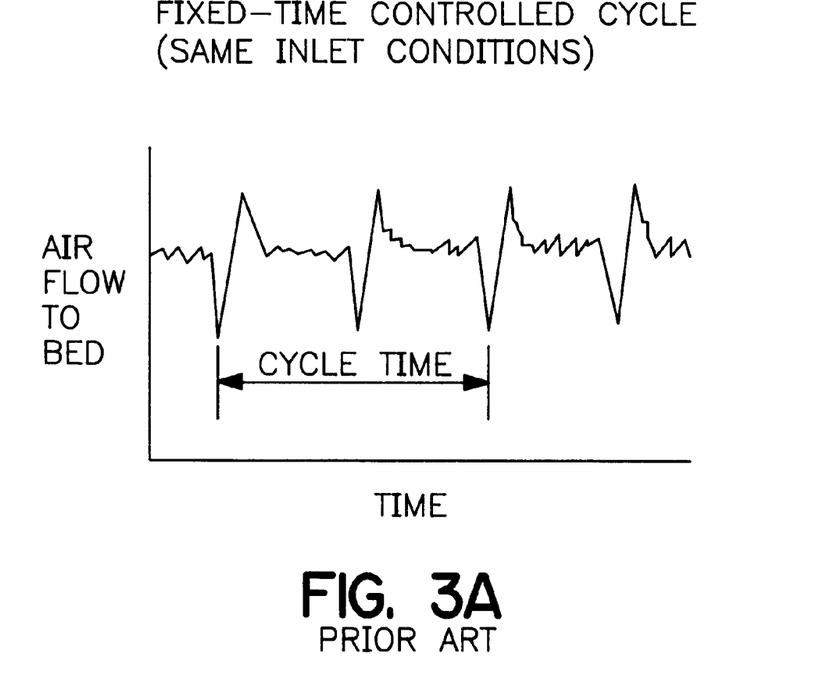
FIG. 3A is a plot of air flow to bed vs. time at the end of a fixed time controlled cycle.
Figure 3B:
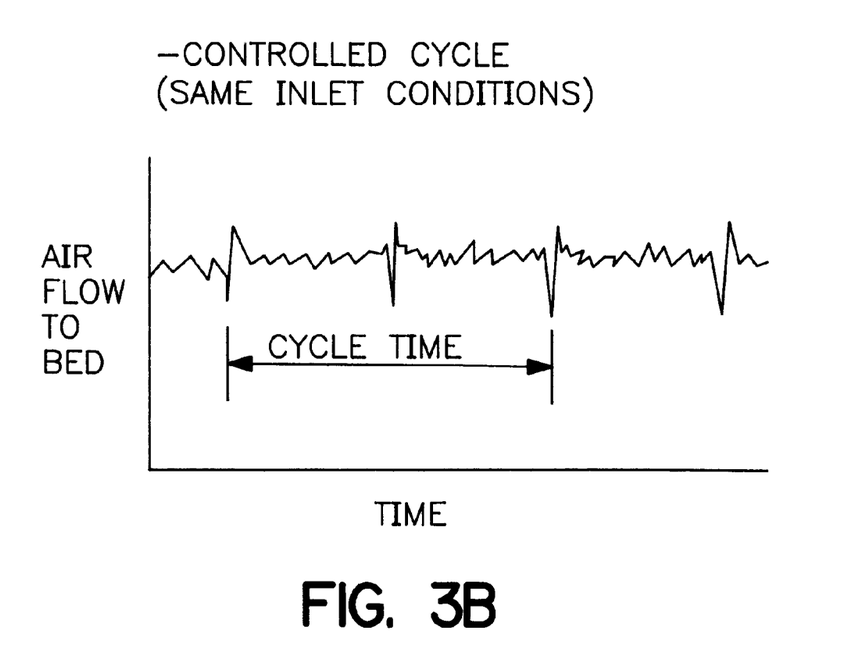
FIG. 3B is a plot of air flow to bed vs. time at the end of a cycle that is controlled in accord with the invention.

FIGS. 3A and 3B present the air flow to the PSA adsorber beds. FIG. 3A gives the air flow under a fixed time-controlled cycle, as in the prior art. Between cycle changes, the air flowing from the prepurifier is relatively steady. However, at the cycle change, the air flow suddenly drops because of the requirement to repressurize one of the beds. The compressor reacts by supplying more air to the prepurifiers. A finite amount of time is required for this to occur. Thus, the initial result is a drop in flow followed by a rapid increase in flow and finally an overshooting of the desired flow. The required flow is thereafter reestablished. This sequence of events causes an unstable condition in the distillation section of the air separation plant which must be compensated.

The improvement brought about by the incorporation of the invention is demonstrated by FIG. 3B. The inlet conditions to the bed are identical to those given for FIG. 3A. The first notable change is the increase in cycle time. This brings about a decrease in the potential for upsets in the distillation system. Controller 130 is programmed such that the flow of the air compressor is increased just prior to the cycle change Thus a larger quantity of air is available to repressurize the adsorber bed at cycle change. Likewise, controller 130 is programmed to reduce the flow back to that required so that overshooting is minimized. Thus, a minimized flow disturbance coupled with an increased cycle time provides for a smoother and more efficient mode of operation.

Figure 4A:
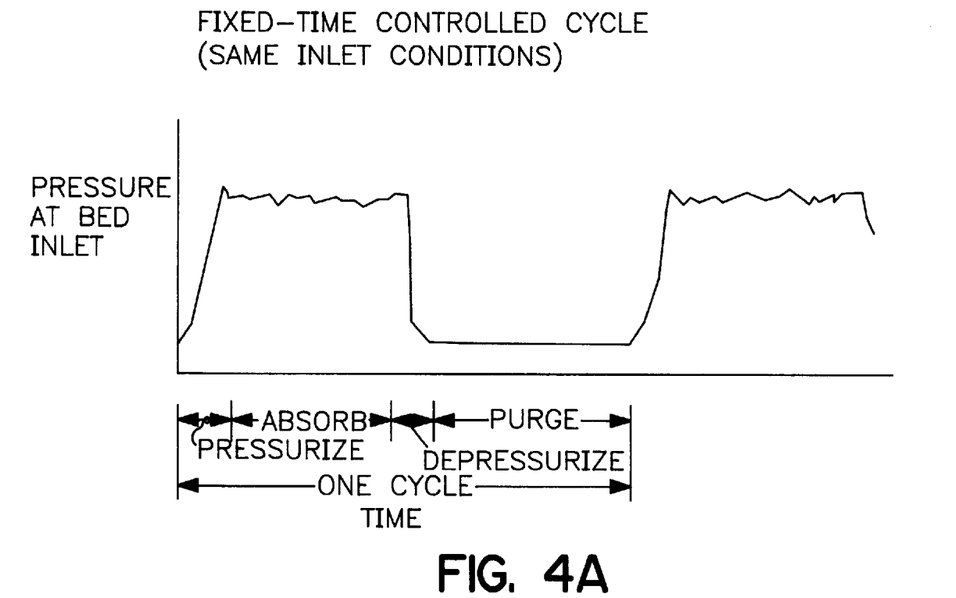
FIG. 4A is a plot of pressure at bed inlet vs. time at the end of a fixed time controlled cycle.
Figure 4B:
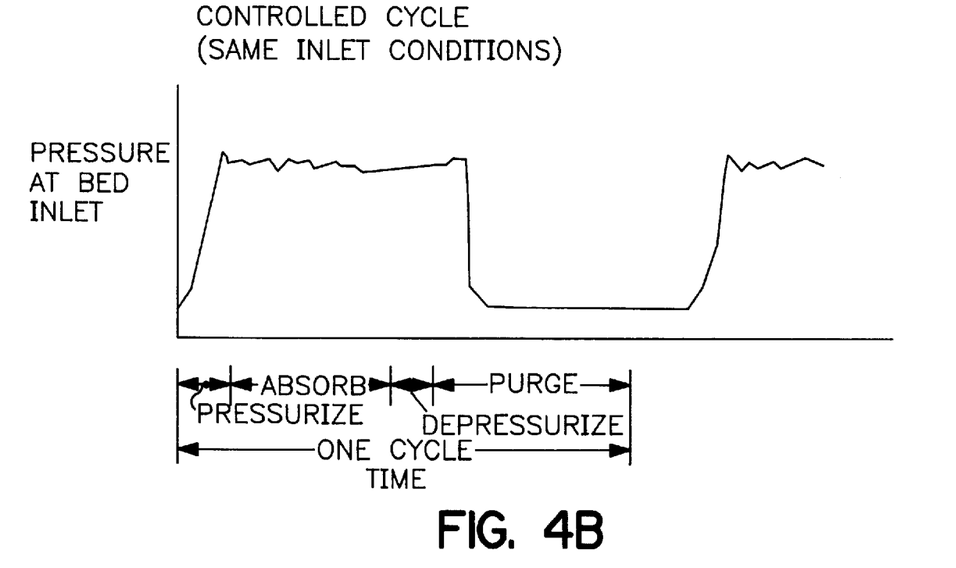
FIG. 4B is a plot of pressure at bed inlet vs. time at the end of a cycle that is controlled in accord with the invention.

The sequence of pressurization actions is depicted in FIGS. 4A and 4B. These two figures are based on identical inlet conditions to the adsorber beds. FIG. 4A shows the pressure at the inlet to the adsorber bed based on a fixed time controlled cycle of the prior art. The adsorber bed is initially pressurized rapidly up to operating pressure. The on-line adsorber bed then maintains a steady pressure during the adsorption phase of the cycle. At the end of the fixed-time cycle, the pressure rapidly drops to a low value, at which time purge gas is admitted for regeneration. At the end of the purge period, the adsorber bed is again repressurized to repeat the cycle.

The plot of FIG. 4A can be compared directly with FIG. 4B which shows the operation under the continuously controlled cycle in accord with the invention. The same sequence of operations is carried out, however, the duration of the cycle is extended because of the full utilization of the adsorbent capacity of the beds.

The method of the invention, as used to control cycle times, can be based on any one or more of the parameters, pressure, temperature, humidity, or air flow to the PSA prepurifier. However, the greatest improvement (and most preferred method) accrues when all four of the parameters are incorporated into the control methodology.

The design of a PSA prepurifier system in accord with the invention generally proceeds in the following manner. The normal or average ambient conditions are noted for the geographical location of the plant. Also considered are the ambient conditions of the hottest day expected. The plant must be capable of producing the design quantities of the desired products under these relatively severe conditions. This then establishes the temperature, pressure, moisture, and carbon dioxide parameters for the design of the PSA prepurifier. These conditions enable the size of the adsorber beds to be determined.

This invention avoids the problems of the prior art wherein a significant portion of the adsorptive bed is not used (when its operation is based on a fixed time cycle). The amount of unused bed will vary with the operating conditions which are not taken into account with a fixed time cycle. Operating with a cycle based on a method that considers the flow of feed air, along with its pressure, temperature and humidity, allows a maximum amount of the bed to be efficiently used without jeopardizing the safe and continued operation of the plant. This extends the time of the cycle, thereby reducing the frequency of blowdowns. Since there will be less loss of air, the operating costs are reduced. The invention further permits the PSA system to be economically sized, thereby minimizing both capital and operating costs.

EXPERIMENTAL

The following examples are based on actual tests conducted on a PSA prepurifier operated over a wide range of conditions. The adsorbent beds of the PSA prepurifier were composites of activated alumina and sodium Y molecular sieve. The Performance data collected included inlet temperature and pressure, specific loading rates, i.e. cubic feet per hour per square foot of bed cross section, purge-to-feed ratios, carbon dioxide and acetylene concentrations at various levels in the beds, and resulting cycle times to breakthrough at the outlet of the bed.

Figure 5A:
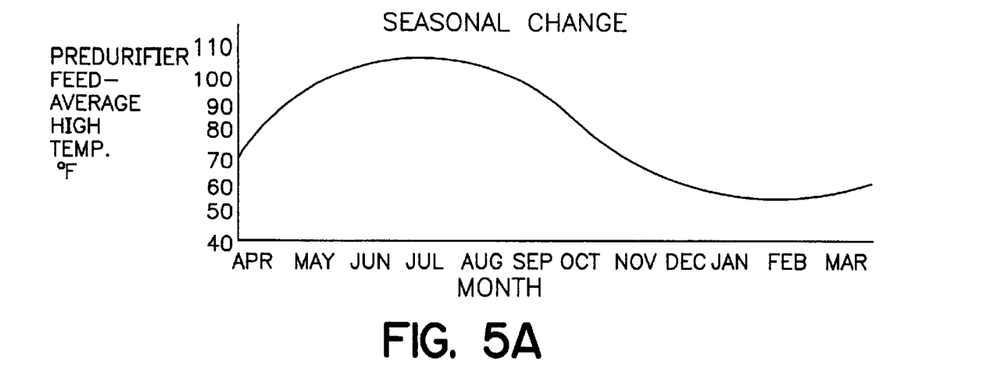
FIG. 5A is a plot of seasonal variation of average high temperature at the prepurifier inlet.
Figure 5B:
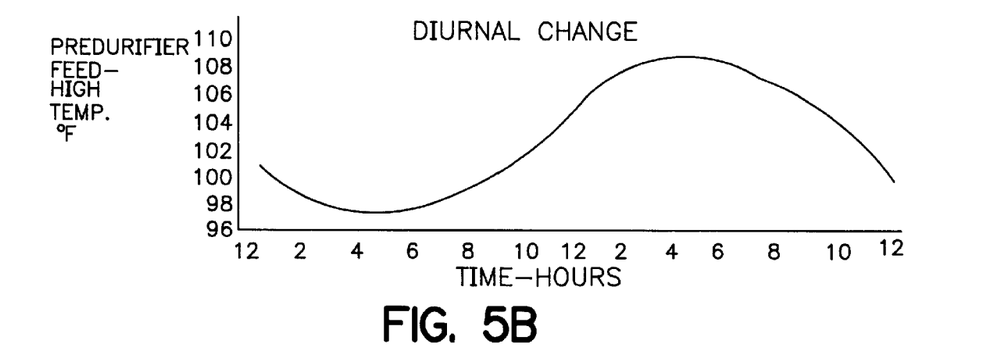
FIG. 5B is a plot of diurnal variation of average high temperature at the prepurifier inlet.

The improvement in operation resulting from the use of the method of the invention is based on diurnal as well as seasonal temperature variations in the feed to the beds. Both of those temperature variations are dependent upon the specific plant location, however, the following data depicts a typical plant having a diurnal temperature swing of 12 degrees Fahrenheit, and a seasonal temperature variation of 52 degrees Fahrenheit. Both temperature swings, diurnal and seasonal, are essentially sinusoidal in nature and are shown in FIGS. 5A and 5B. FIG. 5B reflects the daily temperature variations that would be experienced during the hottest day in July.

It should be noted that the temperatures shown in the graphs are the actual temperatures of the air being fed to the prepurifier and not ambient temperatures. The air feed to the prepurifier has been compressed and then aftercooled prior to being fed into the prepurifier. The feed temperatures reflect the performance of the aftercoolers and the cooling system on the process air.

The following table depicts operation under steady load conditions and presents operating data from which the improved operation of the invention may be seen.

| | Design Conditions | Maximum Improvement Using the Invention | Average Improvement Using the Invention |
|---|---|---|---|
| Air Inlet Temp to Prepurifier, deg. F. (Avg. daily high) | 115 | 57 | 85 |
| Cycle Time, Min. | 17.6 | 32.2 | 28.2 |

Figure 6:
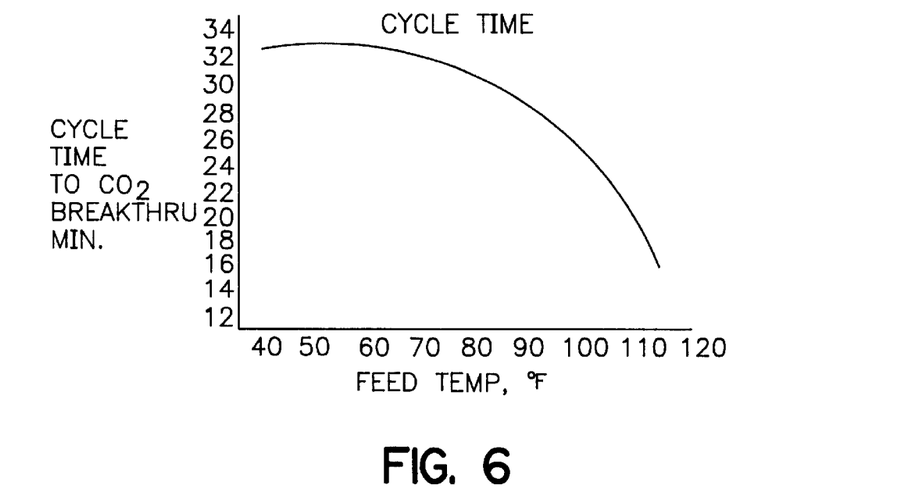
FIG. 6 is a plot of correlation of feed temperature with cycle time to carbon dioxide breakthrough for a steady load operation.

The correlation of feed temperature with cycle time to carbon dioxide breakthrough (0.5 ppm) is shown for steady load operation, in FIG. 6.

Operating a PSA prepurifier system using the method of the invention to determine the cycle time will optimize the use of the adsorber beds when accounting for seasonal changes. Cycle times calculated based on the method, with average daily temperatures and seasonal temperature changes as shown in FIG. 5A, rather than setting the cycle time for hottest day operation, shows that an average cycle time would be 38 per cent longer over a period of a year.

Diurnal changes are followed accurately by the method. Operational improvement with the method following the diurnal changes shown in FIG. 5B account for an additional 11 per cent improvement in cycle time, over and above the seasonal improvement.

Another parameter that influences the loading of the beds is the purge to feed ratio. This parameter is also included in the method to control the cycle time. If operation at a purge to feed ratio of 40 per cent is raised to 50 per cent there is an accompanying improvement in cycle time of about 30 per cent. Also if the bed temperature is high (such as in summer), less purge flow is needed to remove the bed impurities or, if it is desired to further reduce the cycle time, an unchanged purge feed will lead to a still shorter cycle time. The availability of the purge stream can easily be followed by controller 130.

Load changes will also affect the life of the adsorber beds. If, for example, the air separation plant is operated at about 80 per cent load, the use of the method in the control of the cycle time improves the cycle time by about 20 per cent.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A method for control of cycle time of a pressure swing adsorber (PSA) air prepurifier which includes at least a first adsorber and a second adsorber and controller means for controlling air feed to said first adsorber and said second adsorber, said method comprising the steps of:
    a) measuring flow during a determined time period to one said adsorber that is coupled to an air inlet;
    b) accumulating an actual totalized flow to said one said adsorber, based upon measured flow values obtained in step a);
    c) monitoring air feed conditions;
    d) periodically calculating a maximum totalized flow to said one said adsorber, said maximum totalized flow determined, at least in part, based upon said air feed conditions; and
    e) periodically comparing an actual totalized flow value to said calculated maximum totalized flow value and upon a predetermined relationship being reached therebetween, decoupling said one said adsorber from said air inlet and coupling said second said adsorber to said air inlet.

2. The method as recited in claim 1, wherein said determined time period is less than a duration of a cycle of application of air to an adsorber.

3. The method as recited in claim 2, wherein said air feed conditions that are monitored include a temperature of air being fed to said adsorber.

4. The method as recited in claim 3, wherein said air feed conditions that are monitored include a pressure of air being fed to said adsorber.

5. The method as recited in claim 3, wherein said air feed conditions that are monitored include a relative humidity of air being fed to said adsorber.

6. The method as recited in claim 1, wherein said predetermined relationship of step e) is approximate equality.

7. A method as recited in claim 1, comprising the further steps of:
    f) monitoring of customer demand for product air; and
    g) based at least in part on said customer demand, adjusting flow of said air feed to said one said adsorber to extend the time before said decoupling occurs of said one said adsorber from said air inlet and said coupling occurs of said second said adsorber to said air inlet.

8. The method as recited in claim 7, wherein step g) causes said flow of said feed air to decrease to said one said adsorber if said customer demand is reduced.

9. A method as recited in claim 1, comprising the further step of:
  f) temporarily increasing second said adsorber to of a system upset which occurs upon said coupling to said air inlet.

10. A method for control of cycle time of a pressure swing adsorber (PSA) air prepurifier which includes a least a first adsorber and a second adsorber and controlled means for controlling air feed to said first adsorber and said second adsorber, said method comprising the steps of
  a) measuring flow during a determined time period to one said adsorber that is coupled to an air inlet;
  b) accumulating an actual totalized flow to said one said adsorber, based upon measured flow values obtained in step a);
  c) monitoring air feed conditions;
  d) based at least in part on said totalized flow, decoupling said one said adsorber from said air inlet and coupling a second said adsorber to said air inlet: and
  e) based upon a condition of said one said adsorber, adjusting purge gas flow to said one said adsorber to reduce the time needed to ready said one said adsorber for a next cycle.

11. The method as recited in claim 10, wherein step e) monitors a temperature of said one said adsorber and adjusts said purge flow in accordance therewith.

12. The method as recited in claim 11, wherein step e) causes said purge flow to increase if said temperature is determined to fall and to decrease said purge flow if said temperature is determined to rise.

13. A system for control of cycle time of a pressure swing adsorber (PSA) air prepurifier that receives air from an air inlet, comprising:

a first adsorber and a second adsorber;

means for measuring flow during a determined time period to one said adsorber that is coupled to said air inlet;

means for monitoring air feed conditions to said first adsorber and said second adsorber;

controller means for controlling air feed to said first adsorber and said second adsorber, said controller means
  (i) accumulating an actual totalized flow to said one said adsorber, based upon measured flow values determined by inputs from said means for measuring;
  (ii) periodically calculating a maximum totalized flow to said one said adsorber, said maximum totalized flow determined, at least in part, based upon said air feed conditions; and
  (iii) periodically comparing an actual totalized flow value and upon a predetermine relationship being reached therebetween generating a signal to cause a decoupling of said one said adsorber from said air inlet and coupling of a second said adsorber to said air inlet.

14. The system as recited in claim 13, wherein said determined time period is less than a duration of a cycle of application of air to an adsorber.

15. The system as recited in claim 14, wherein said air feed conditions that are monitored include a temperature of air being fed to said adsorber.

16. The system as recited in claim 15, wherein said air feed conditions that are monitored include a pressure of air being fed to said adsorber.

17. The system as recited in claim 16, wherein said air feed conditions that are monitored to ascertain the moisture content of air being fed to said absorber.

18. The system as recited in claim 13, wherein said predetermined relationship is approximate equality.

* * * * *